Oct. 4, 1927.

E. K. BAKER 1,644,222

PLANETARY REDUCTION GEAR

Filed Jan. 8, 1923   2 Sheets-Sheet 1

Oct. 4, 1927.  
E. K. BAKER  
1,644,222  
PLANETARY REDUCTION GEAR  
Filed Jan. 8, 1923  
2 Sheets-Sheet 2

Inventor:  
Erle K. Baker

Patented Oct. 4, 1927.

1,644,222

UNITED STATES PATENT OFFICE.

ERLE K. BAKER, OF DETROIT, MICHIGAN, ASSIGNOR TO BAKER REDUCTION GEAR COMPANY, OF DETROIT, MICHIGAN, A CORPORATION OF MICHIGAN.

PLANETARY REDUCTION GEAR.

Application filed January 8, 1923. Serial No. 611,265.

My invention relates generally to improvements in planetary reduction gears, but relates more particularly to reduction gearing as applied to the steering equipment of automobiles where the elements of size and maximum reduction are factors of importance.

Steering equipment for automobile use in order to meet satisfactorily the peculiar conditions that obtain with respect to its manufacture and use, should be of simple and durable construction; it should be of such construction that it can be purchased at low cost; it should be so constructed that a reduction of approximately six to one can be obtained in order that easy steering may be assured; and at the same time, it should be of compact construction so that it may fit properly in the limited space generally available for mechanism of this kind, and also to the end that a proper size relation of the parts, such as is highly desired in automobile practice, may be attained. Furthermore for automobile steering use it is desirable that the shock of the wheels caused by striking obstructions and the like can be properly absorbed in the reduction gearing without injury thereto and to the end that the driver may more easily control the car.

It is, therefore, an object of my invention to provide a planetary gear construction which shall be better adapted to meet the requirements of automobile practice.

Another object of my invention is to provide a planetary gear construction wherewith a greater reduction can be secured, with a gear arrangement of given size than is possible with the constructions heretofore devised, and yet provide a construction that shall be well adapted to withstand operating conditions satisfactorily.

Again I aim to provide a construction in which there shall always be, at any given instant, one pair of gears in which the teeth shall interfit in substantially the best driving relation, to the end that a constant contact drive may be had.

My invention consists generally in a device of the form, arrangement, construction, and co-action of the parts, whereby the above named objects, together with others that will appear hereinafter are attainable; and my invention will be more readily understood by reference to the accompanying drawings which illustrate what I consider, at the present time, to be the preferred embodiment thereof.

Figure 1:
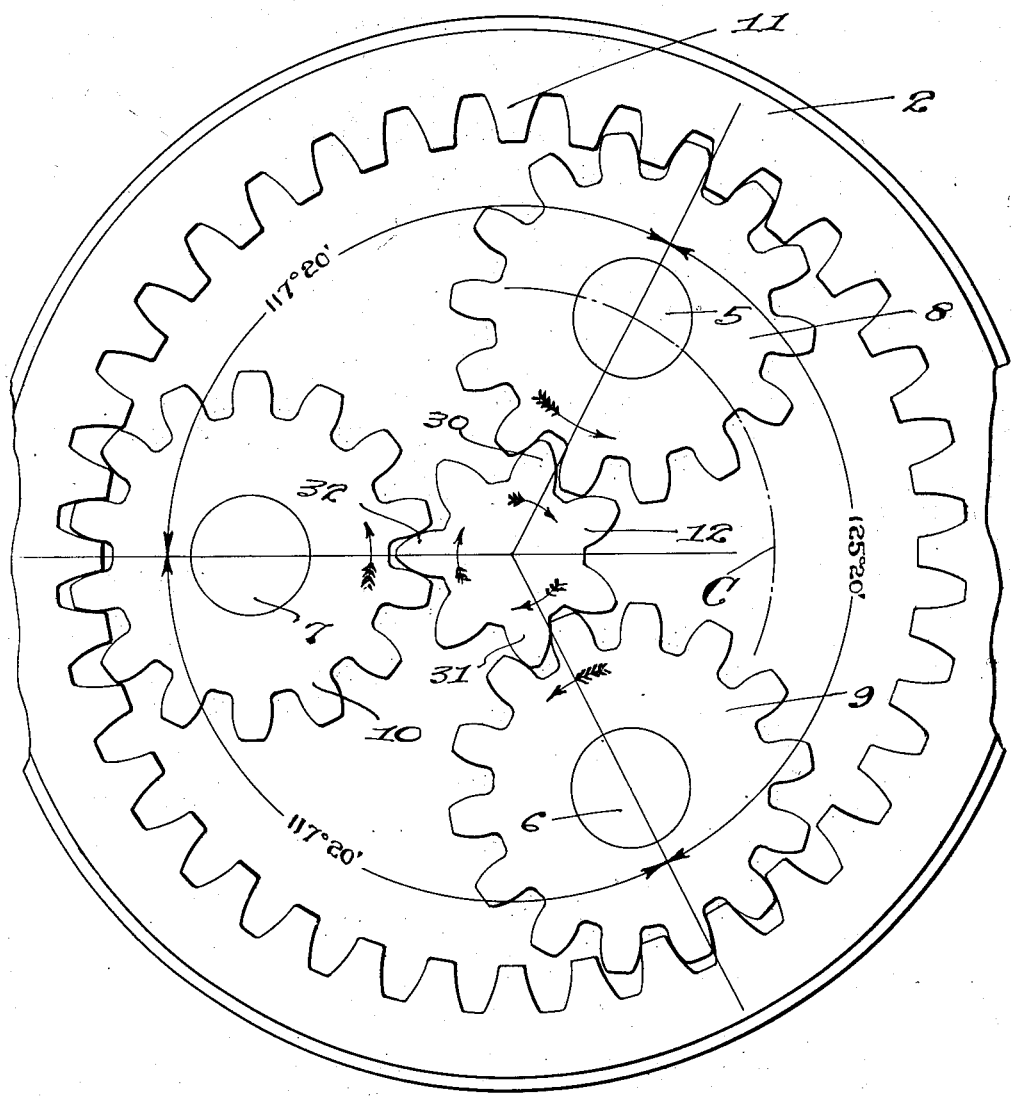
Fig. 1 is a diagrammatic view of gearing embodying my invention.
Figure 2:
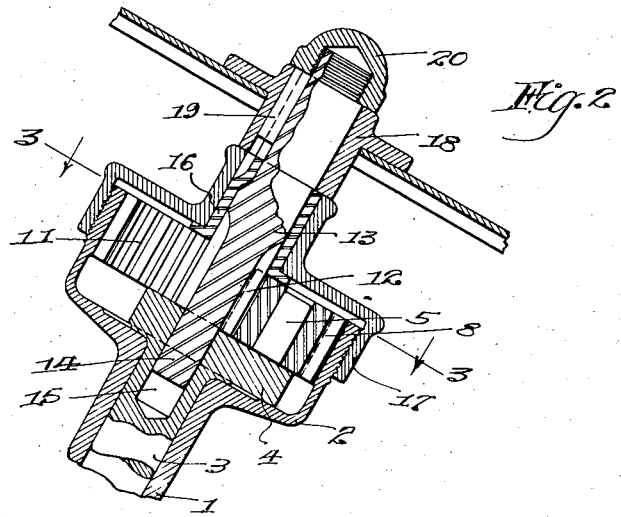
Fig. 2 is a vertical sectional detail view of gearing mechanism embodying my invention and applied to the steering post of an automobile.
Figure 3:
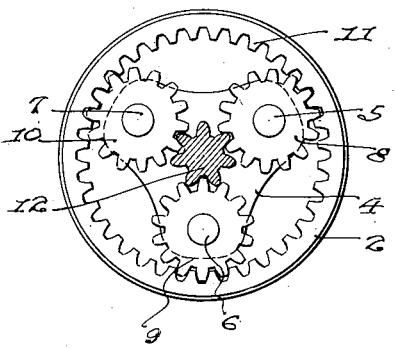
Fig. 3 is a face view of the gearing of Fig. 2, substantially along the line 3—3 thereof, the housing cover being removed.
Figure 4:
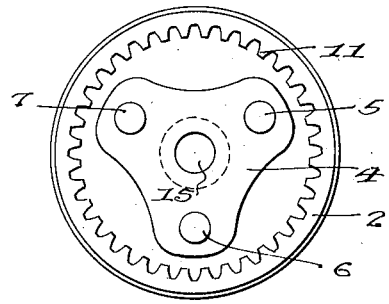
Fig. 4 is a view similar to Fig. 3 but with the gears omitted.

Referring now particularly to Figs. 2, 3 and 4, illustrating the gearing as arranged for automobile practice, 1 represents the steering post column, which at its upper end terminates in a housing 2 that accommodates the gears forming the planetary system. The housing and gear are drawn substantially to scale so that it is evident that the parts must be arranged within a relatively small space. For this reason, the larger descriptive view Fig. 1 has been made and which will later be described. A steering post 3 is provided within the column 1 and which terminates at its upper end in a substantially triangular shaped portion 4. Upstanding from the portion 4 are three cylindrical bosses 5, 6 and 7 upon which are mounted for rotation the external spur gears 8, 9 and 10, respectively. As will appear more clearly hereinafter the centers of the bosses 5, 6 and 7 are arranged on a common circle but they are not spaced apart an equal distance.

The external spur gears 8, 9 and 10 are in engagement with an internal spur gear 11 which is a part of the fixed housing 2. They are also in engagement with a centrally disposed spur gear 12, which is formed as a part of a post 13, which post has a lower end portion 14 that is rotatably mounted in a recess 15 in the steering post 3. The upper end of the post 13 is held in proper alignment by the bushed portion 16 of the cover 17 that closes the housing 2. To the upper portion of the post 13, the hub portion 18 of the steering wheel is secured as by means of the key 19. Assembly is completed by the nut 20.

Having thus described the general assembly of a practical embodiment, the advan- tages will be better understood by reference to the enlarged descriptive or diagrammatic view Fig. 1 wherein similar parts have been given similar reference characters. As before stated I have purposely arranged the gears 8, 9, and 10 upon a common circle, C which for purposes of identification is composed of dots and dashes and which is concentrically disposed around the central gear 12. It should be noted, however, that the centers are not equally spaced around the circle C. Thus in the instant case the centers of gears 10 and 8, and 9 and 10 are spaced apart 117 degrees and 20 minutes (117° 20') whereas gears 8 and 9 are spaced apart 125 degrees and 20 minutes (125° 20'). Let us now examine the novel result thereby attained between the respective gears 8, 9 and 10 and the gear 12. For the sake of clearness the gear 12 will be considered as being rotated in the direction of the arrow thereon and thereby causing rotation of the gears 8, 9 and 10 in the directions indicated. It will be noted that gear tooth 30 of gear 12 is just entering the tooth pocket in gear 8, that gear tooth 31 is just leaving the tooth pocket of gear 9 and that gear tooth 32 is in a central or full driving position in gear 10. There is, therefore, always one pair of gears that are in the best operative position. In other words, the progressive action described provides what may conveniently be termed a constant contact drive.

The same progressive relation exists between the teeth of the spur gears 8, 9 and 10 and those of the surrounding internal gear 11, and hence the same advantages result.

In the particular design illustrated the reduction obtained is five and one seventh to one (5 1/7th to 1) which is ideally adapted for automobile use. With my gearing an automobile can be driven with so little steering effort so that the driver is free to enjoy the drive. Furthermore, because of the novel gear relation before described, the tendency of the wheels to cause rotation of the steering wheel, as for example when the wheels strike an obstruction, is absorbed in the gearing to such an extent that but a minimum of movement is imparted to the steering wheel. There will also be one set of gears that will always be disposed in a position best adapted to withstand such shocks.

The many advantages of my invention will be understood by those skilled in the art to which this appertains without further comment.

I claim:—

1. A planetary reduction gear embodying therein, an internal gear, an external gear disposed centrally therein, and a plurality of pinions so spaced around said external gear, and meshing therewith and with said internal gear, that one of said pinions has a meshing relation with said gears which is different from the meshing relation between another pinion and said gears.

2. A planetary reduction gear embodying therein, an internal gear, an external gear disposed centrally therein, and a plurality of pinions arranged around said centrally disposed external gear and meshing therewith and with said internal gear, the distance between one of said pinions and another one thereof being different from the distance between said first mentioned pinion and a third pinion so that one of said pinions has a meshing relation with said gears which is different from that between one of the other pinions and said gears.

3. In a planetary reduction gear, the combination of an internal gear, an external spur gear arranged centrally therein, a member rotative with respect to said external spur gear, and a plurality of external spur gears journalled on said member and arranged around said central gear and in mesh therewith and being positioned so that no two of said gears arranged around said central gear will occupy the same driving relation with respect to said internal gear and said first mentioned spur gear.

4. A planetary reduction gear embodying therein, an internal gear, an external gear disposed centrally therein, and a plurality of pinions arranged around said external gear in the same circular path, the distance from one pinion center to the next pinion center in one direction around said path being different from the distance from said first pinion center to the next pinion center in the opposite direction around said path so that no two pinions have the same meshing relation with said internal and external gears.

5. A planetary reduction gear embodying therein, an internal gear, an external gear disposed centrally therein and having a number of teeth indivisible by three, and a plurality of pinions, so arranged around said external gear and meshing therewith and with said internal gear that one of said pinions has a meshing relation with said gears which is different from the meshing relation between another of said pinions and said gears.

6. In a planetary gearing, the combination of an internal gear, an external gear arranged coaxially therein, and an odd number of pinions interposed between and meshing with said internal and said external gears, said pinions being so spaced unequal arcuate distances apart that one pinion has a meshing relation with said gears which is different from the meshing relation between another pinion and said gears.

7. In a planetary gearing, the combination of an internal gear, an external gear arranged coaxially therein, and an odd number of pinions interposed between and meshing with said internal and said external gears, said pinions being so arcuately spaced that no two of said pinions will occupy the same driving relation with respect to said internal gear and said external gear.

8. In a planetary gearing, the combination of an internal gear, an external gear arranged coaxially therein, and an odd number of pinions interposed between and meshing with said internal and said external gears, the arcuate distance between one pinion center to the next pinion center in one direction being different than the arcuate distance between said first mentioned pinion and the next pinion in another direction so that no two pinions will occupy the same meshing relation with respect to said internal gear and said external gear.

In testimony whereof, I have hereunto set my hand, this 4th day of January, 1923.

ERLE K. BAKER.